United States Patent
Michaelis et al.

(10) Patent No.: US 10,499,457 B2
(45) Date of Patent: Dec. 3, 2019

(54) COMBINED CELLULAR BASE STATION AND ROADSIDE UNIT SYSTEM HAVING A COMMON BACKHAUL AND RELATED METHODS

(71) Applicant: CommScope Technologies LLC, Hickory, NC (US)

(72) Inventors: Scott L. Michaelis, Plano, TX (US); Kevin E. Linehan, Rowlett, TX (US)

(73) Assignee: CommScope Techologies LLC, Hickory, NC (US)

( * ) Notice: Subject to any disclaimer, the term of this patent is extended or adjusted under 35 U.S.C. 154(b) by 12 days.

(21) Appl. No.: 15/718,426

(22) Filed: Sep. 28, 2017

(65) Prior Publication Data

US 2018/0092160 A1  Mar. 29, 2018

Related U.S. Application Data

(60) Provisional application No. 62/400,820, filed on Sep. 28, 2016.

(51) Int. Cl.
*H04W 88/08* (2009.01)
*H04L 12/723* (2013.01)
*H04L 12/10* (2006.01)
*H04W 84/18* (2009.01)
*H04W 84/12* (2009.01)

(52) U.S. Cl.
CPC ............ *H04W 88/08* (2013.01); *H04L 45/50* (2013.01); *H04L 12/10* (2013.01); *H04W 84/12* (2013.01); *H04W 84/18* (2013.01)

(58) Field of Classification Search
CPC ....... H04W 88/08; H04W 4/44; H04W 84/12; H04W 84/18; H04L 45/50; H04L 12/10
See application file for complete search history.

(56) References Cited

U.S. PATENT DOCUMENTS

| | | | |
|---|---|---|---|
| 2002/0065599 A1* | 5/2002 | Hameleers | G08G 1/09 701/117 |
| 2008/0095134 A1* | 4/2008 | Chen | H04B 7/2606 370/342 |
| 2013/0079040 A1* | 3/2013 | Charbit | H04W 68/00 455/458 |
| 2013/0201316 A1* | 8/2013 | Binder | H04L 67/12 348/77 |
| 2013/0215768 A1* | 8/2013 | Meloche | H04L 43/50 370/252 |
| 2013/0322449 A1* | 12/2013 | Hwang | H04L 45/50 370/392 |
| 2017/0156119 A1* | 6/2017 | Neves | H04W 52/283 |
| 2017/0270787 A1* | 9/2017 | Menard | G08G 1/096783 |
| 2018/0048994 A1* | 2/2018 | Kwon | H04W 72/1294 |

(Continued)

OTHER PUBLICATIONS

Fathy et al. "Improving QoS in VANET Using MPLS" in 7th International Symposium on Intelligent Systems Techniques for Ad hoc and Wireless Sensor Networks (IST-AWSN 2012) (Year: 2012).*

(Continued)

*Primary Examiner* — Wutchung Chu
(74) *Attorney, Agent, or Firm* — Myers Bigel, P.A.

(57) ABSTRACT

A system includes a cellular base station and a roadside unit. The roadside unit is configured to communicate data directly on a backhaul communication medium that connects the cellular base station to a controller for the cellular base station.

20 Claims, 5 Drawing Sheets

(56) References Cited

U.S. PATENT DOCUMENTS

| | | | |
|---|---|---|---|
| 2018/0061129 A1* | 3/2018 | Sisbot | G06T 19/006 |
| 2018/0077241 A1* | 3/2018 | Byun | H04W 76/30 |
| 2018/0139586 A1* | 5/2018 | Park | H04W 4/06 |
| 2018/0146471 A1* | 5/2018 | Xu | H04W 4/44 |
| 2018/0199194 A1* | 7/2018 | Xu | H04W 8/02 |
| 2018/0262887 A1* | 9/2018 | Futaki | H04W 48/20 |

OTHER PUBLICATIONS

Morgan, Y.L. "Notes on DSRC & WAVE Standards Suite: Its Architecture, Design and Characteristics"; IEEE Communications Surveys & Tutorials, vol. 12(4):504-518, 2010 (Year: 2010).*

* cited by examiner

COMBINED CELLULAR BASE STATION AND ROADSIDE UNIT SYSTEM HAVING A COMMON BACKHAUL AND RELATED METHODS

CROSS REFERENCE TO RELATED APPLICATION

The present application claims priority to U.S. Provisional Patent Application Ser. No. 62/400,820, filed Sep. 28, 2016, the entire content of which is incorporated by reference herein as if set forth in its entirety.

BACKGROUND

The present invention relates to communication networks, and, more particularly, to communication networks that support vehicle communication.

Automotive driver assist features in cars are becoming commonplace. Automotive manufacturers are using automation to assist with vehicle safety and routing. Many organizations—both governmental and commercial—are working on new technologies that may enable greater safety and efficiency in automotive transportation. As driving becomes more automated, some research predict that at least 80% of all accidents can be avoided, carbon emissions reduced substantially, and more effective use of road and parking space can be achieved.

Vehicle-to-vehicle communication technology is currently provided on some cars and may be widespread in the future. Vehicle-to-infrastructure communication technology is being developed and tested and is also expected to become widespread in the future.

The IEEE 802.11p industry standard has been developed to support vehicle-to-infrastructure communication and many governmental authorities and regulatory bodies around the world have allocated frequencies near 5 GHz for vehicular communications. With the cars available now that can talk to each other, vehicle-to-infrastructure is expected to be deployed in more areas to improve vehicular safety and driver convenience.

FIG. 1 illustrates a conventional vehicle-to-infrastructure system in which a roadside unit is used to provide connectivity support to passing vehicles. As shown in FIG. 1, a roadside unit (RSU) 110 is used to communicate with vehicles near an intersection, such as vehicle 120, to provide each other with information, such as safety warnings and traffic information. The RSU 110 and the communication unit in the vehicle 120 are both dedicated short-range communications (DSRC) devices. DSRC works in the 5.9 GHz band with a bandwidth of 75 MHz and an approximate range of 1000 meters. The communication between nodes comprising vehicles and roadside units may be part of an overall intelligent transportation system (ITS).

Operation of vehicle-to-infrastructure communication may be illustrated by way of example with reference to FIG. 1. In the scenario illustrated in FIG. 1, a traffic signal controller 130 transfers information to the RSU 110 regarding the signal phase of the traffic light 140 and the amount of time remaining until the light changes. The RSU 110 transmits the traffic light 140 information to the vehicle 120. The on-board communication unit in the vehicle 120 receives the RSU 110 information and displays an appropriate alert regarding the state of the traffic signal 140 for the driver. For example, the vehicle may provide a visual and/or auditory alert that the driver is at risk of running a red light. A backhaul connection 150, such as a fiber optic and/or electrical cable may be used to connect a traffic management center 160 to the traffic signal controller 130 and/or the RSU 110. The traffic management center 160 may manage the flow of traffic on surrounding roads and highways based on data collected from vehicles and RSUs, such as the vehicle 120 and the RSU 110.

SUMMARY

In some embodiments of the present inventive concept, a system comprises a cellular base station and a roadside unit. The roadside unit is configured to communicate data directly on a backhaul communication medium that connects the cellular base station to a controller for the cellular base station.

In other embodiments, the system further comprises a housing and the cellular base station is at least partially enclosed within the housing and the roadside unit is at least partially enclosed within the housing.

In still other embodiments, the system further comprises a power supply that is coupled to both the cellular base station and the roadside unit. The power supply is at least partially enclosed within the housing.

In still other embodiments, the system further comprises a processor that is coupled to the cellular base station and the roadside unit and is configured to process cellular base station data and the roadside unit data.

In still other embodiments, the backhaul communication medium comprises a time division multiplexing connection to the controller.

In still other embodiments, the time division multiplexing connection comprises a T1 connection.

In still other embodiments, the backhaul communication medium comprises a packet switched connection to the controller.

In still other embodiments, the packet switched connection comprises an Ethernet connection.

In still other embodiments, the roadside unit is further configured to communicate packet data on the packet switched connection to the controller.

In still other embodiments, the packet data of the roadside unit comprise Multiprotocol Label Switching (MPLS) packet data.

In still other embodiments, a label of the MPLS packet data comprises an identifier that identifies a communication service provider.

In still other embodiments, a label of the MPLS packet data comprises an identifier that is associated with a regulatory constraint of a governmental administrative authority.

In still other embodiments, the system further comprises a weather module that is configured to communicate data directly on the backhaul communication medium. The weather module is at least partially enclosed within the housing.

In still other embodiments, the weather module data comprises a measurement of an environmental parameter.

In still other embodiments, the measurement of the environmental parameter comprises one of a temperature measurement, a humidity measurement, a wind speed measurement, and a barometric pressure measurement.

In still other embodiments, the backhaul communication medium comprises a packet switched connection to the controller and the weather module is further configured to communicate packet data on the packet switched connection to the controller.

In still other embodiments, the packet data of the weather module comprise Multiprotocol Label Switching (MPLS) packet data.

In still other embodiments, a label of the MPLS packet data comprises an identifier that identifies a communication service provider.

In still other embodiments, the system further comprises a mounting apparatus that is configured to attach the cellular base station and the roadside unit to a support structure.

In still other embodiments, the cellular base station is configured to support LTE-V2V and/or 5G-V2X and the roadside unit supports IEE 802.11p.

In further embodiments of the inventive concept, a method comprises routing cellular traffic on a backhaul communication medium that connects a cellular base station to a controller for the cellular base station and routing roadside unit data directly on the backhaul communication medium.

In still further embodiments, the backhaul communication medium comprises a packet switched connection to the controller.

In still further embodiments, the packet switched connection comprises an Ethernet connection.

In still further embodiments, routing the roadside unit data comprises routing roadside unit packet data on the packet switched connection to the controller.

In still further embodiments, the roadside unit packet data comprise Multiprotocol Label Switching (MPLS) packet data.

In still further embodiments, a label of the MPLS packet data comprises an identifier that identifies a communication service provider.

In still further embodiments, a label of the MPLS packet data comprises an identifier that is associated with a regulatory constraint of a governmental administrative authority.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
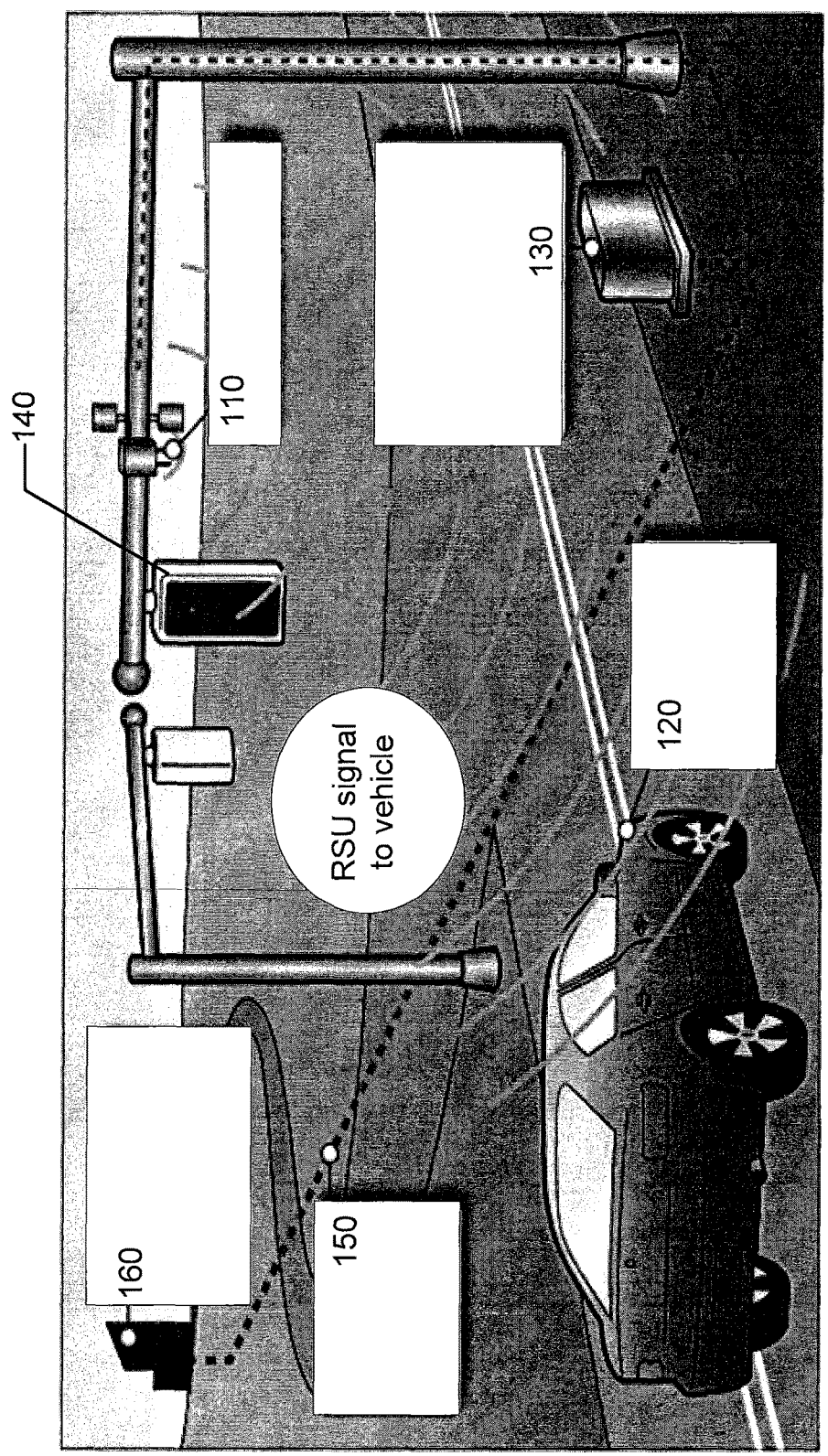
FIG. 1 is a block diagram that illustrates a conventional vehicle-to-infrastructure system in which a roadside unit is used to provide connectivity support to passing vehicles.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. In addition, a mobile terminal may include devices that communicate via short or medium range technologies including, but not limited to, Dedicated Short Range Communications (DSRC), which may be used in Intelligent Transportation Systems (ITS) to facilitate vehicle-to-vehicle and vehicle-to-infrastructure communications.

Embodiments are described herein in the context of a wireless communications network based on a Global System for Mobile (GSM) communication infrastructure. It will be understood that the disclosed examples are for purposes of illustration and that other types of communication infrastructures, such as, for example, Code Division Multiple Access (CDMA), LTE, or other Wide Area Network (WAN) technology, can be used in accordance with further embodiments of the inventive concept.

Some embodiments of the inventive subject matter stem from a realization that RSUs are often deployed in urban areas, along highways, and other heavily traveled roadways. These same areas may also be good candidates for deployment of base stations for cellular communication networks. In some embodiments of the inventive concept, an RSU and cellular base station may be deployed so as to allow the RSU to communicate directly on the backhaul communication medium that connects the cellular base station to a controller for the cellular base station. Such a deployment may eliminate the need for installing electrical cable, optical cable, or wireless infrastructure to provide a communication connection between the RSU and a traffic management center. In some embodiments, the cellular base station and RSU can share a common housing where each of the RSU and cellular base station are at least partially enclosed within the housing. The RSU and cellular base station may also share a common power supply, which is at least partially enclosed within the housing. A common mounting apparatus may be used to attach both the cellular base station and RSU to a support structure, such as a pole, platform, building, or other suitable structure. In addition to the RSU, a weather module may also be configured to communicate directly on the backhaul communication medium that connects the cellular base station to the controller. The weather module may also be at least partially enclosed within the housing with the cellular base station and/or the RSU. In some embodiments, Multiprotocol Label Switching (MPLS) technology may be used to identify packets of the RSU and/or the weather module. An MPLS identifier may be used to identify a communication service provider for the RSU packets and/or to identify that the RSU packets are associated with a regulatory constraint of a governmental administrative authority, e.g., that the RSU packet traffic is managed by a governmental agency. The use of MPLS may allow the RSU and/or weather station traffic to be identified and processed separately from each other and/or from cellular traffic. For example, a cellular service provider may have a special fee arrangement for carrying the RSU and/or weather station traffic on the backhaul communication medium. In addition, a communication service provider for the RSU and/or weather station traffic may be identified using MPLS allowing the operator of the cellular base station and base station controller to more easily route the RSU and/or weather station traffic to another service provider. Thus, embodiments of the inventive concept may reduce the amount of physical infrastructure and/or plant in deployment of a cellular base station and RSU/weather station and may also provide a mechanism for identifying the RSU and/or weather station traffic for billing and/or routing purposes.

Figure 2:
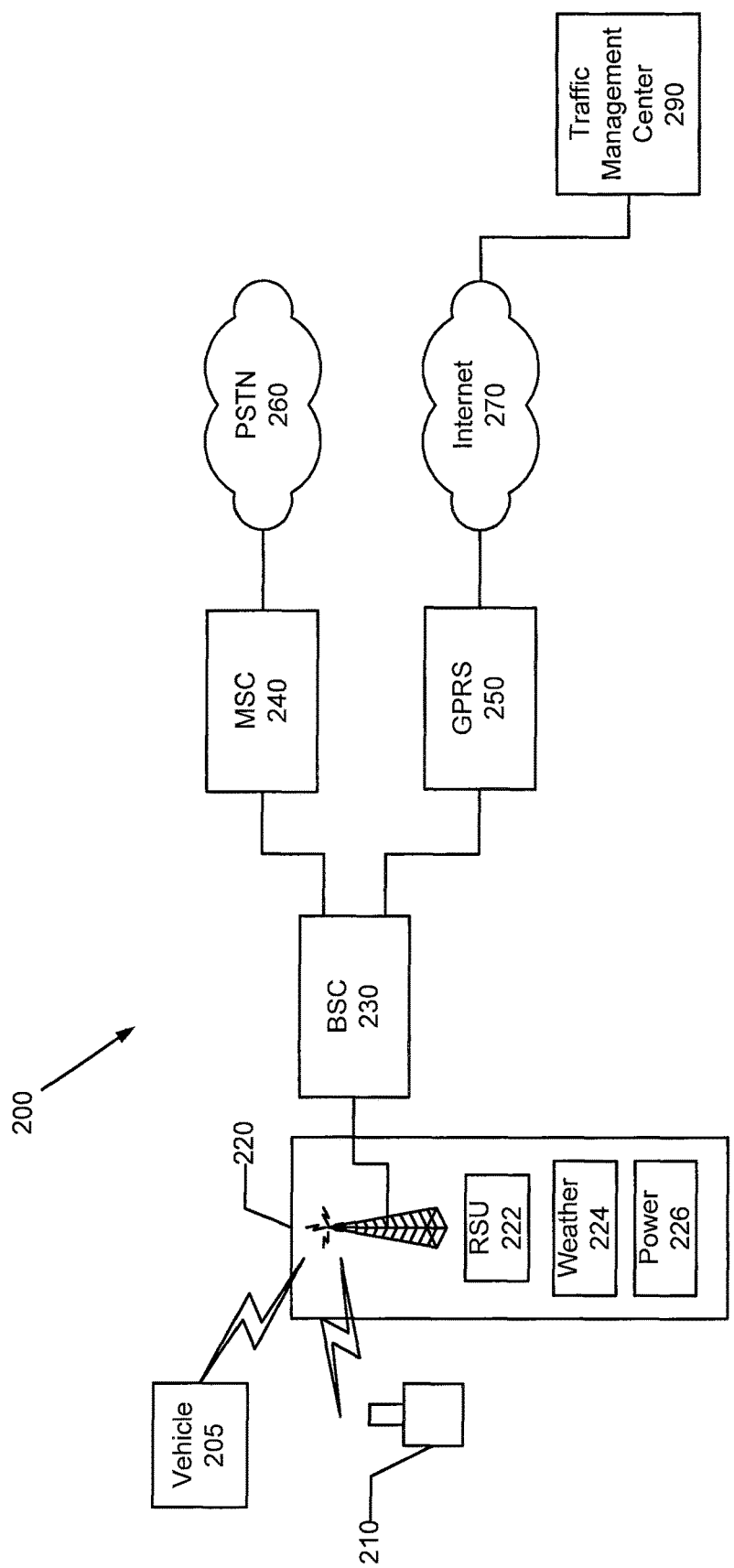
FIG. 2 is a is a block diagram that illustrates a communication network including a combined cellular base station and roadside unit in accordance with some embodiments of the present inventive concept.

FIG. 2 is a block diagram that illustrates a communication network including a combined cellular base station and RSU in accordance with some embodiments of the present inventive concept. Referring now to FIG. 2, a network architecture 200, according to some embodiments of the inventive concept, comprises GSM infrastructure components including a base station transceiver (BTS) 220, a base station controller (BSC) 230, a mobile switching center (MSC) 240, and a general packet radio service (GPRS) 250. The GSM infrastructure components are coupled to destinations via the Public Switched Telephone Network (PSTN) 260 and the Internet 270. The destinations may include a traffic management center 290 for managing one or more RSUs.

The BTS 220 and BSC 230 comprise the base station subsystem (BSS), which is responsible for handling traffic and signaling between a mobile terminal, such as a mobile terminal 210, and the network switching subsystem comprising MSC 240 and GPRS 250. The BTS 220 contains the equipment for transmitting and receiving radio signals including transceivers and antennas along with equipment for encrypting and decrypting communication with the BSC 230. The BSC 230 typically controls multiple BTSs 220 and is used to manage the allocation of radio channels, receive measurements from the mobile terminals, and control handovers of mobile terminals between BTSs 220.

The MSC 240 is the primary service delivery node for a GSM telecommunications infrastructure and is responsible for routing circuit switched voice calls as well as other services, such as conference calls, FAX, and circuit switched data calls to destinations. The MSC 240 may set up and release end-to-end connections with a destination, such as a circuit switched connection between the mobile terminal 210 and another party over the PSTN 260.

The GPRS 250 provides mobility management, session management, and transport for IP packet services between, for example, devices that have an IP communication capability and other devices, servers, and the like over the Internet 270.

Additional networks may also be used to couple the MSC 240 and GPRS 250 to the traffic management center 290 and/or other devices, servers, and the like including, but not limited to, a wide area network, a local area network, an Intranet, or other private network, which may not accessible by the general public. Thus, the MSC 240 and GPRS 250 may be coupled to the traffic management center 290 and/or other devices, servers, and the like using a combination of public and private networks or a virtual private network (VPN).

As shown in FIG. 2, the base station transceiver 220 further comprises an RSU 222 and a weather module 224. The RSU 222 may be managed by the traffic management center 290 and used to communicate with vehicles 205 to transmit and receive traffic and/or travel information. The RSU 222 is deployed so as to allow the RSU 222 to communicate directly on the backhaul communication medium that connects the base station transceiver 220 to the BSC 230. The base station transceiver 220 and the RSU 222 may share a common housing and the base station transceiver 220 and RSU 222 may be at least partially enclosed within the housing. The RSU 222 and base station transceiver 220 may also share a common power supply 226, which may be at least partially enclosed within the housing. A weather module 224 may also be configured to communicate directly on the backhaul communication medium that connects the base station transceiver 220 to the BSC 230. The weather module 224 may provide weather information and updates to the RSU 222 and/or the traffic management center 290, which can be communicated to the vehicles 205. The weather module 224 may also be at least partially enclosed within the housing with the base station transceiver 220 and RSU 222 and may also share the same power supply 226. A common mounting apparatus may be used to attach the base station transceiver 220, RSU 222, and/or weather module 224 to a support structure, such as a pole, platform, building, or other suitable structure.

Although FIG. 2 illustrates an exemplary communication network, it will be understood that the present inventive subject matter is not limited to such configurations, but is intended to encompass any configuration capable of carrying out the operations described herein. For example, FIG. 2 illustrates an exemplary 2G GSM network architecture 200. In a 3G GSM architecture, the base station transceiver 220 may be called a Node and the base station controller 230 may be called a radio network controller. In some embodiments, the BTS 220 and BSC 230 may support the LTE-V2V (vehicle-to-vehicle) and/or 5G-V2X standards. It will be further understood, however, that embodiments of the inventive concept are not limited to GSM. Other communication infrastructures, such as CDMA, LTE, or other WAN technology, can be used in accordance with further embodiments of the inventive concept. Thus, the base station transceiver 220 may be referred to generally as a cellular base station and the BSC 230 may be referred to generally as a controller for the cellular base station. In some embodiments, the RSU 222 may support the IEEE 802.11p standard for wireless access in vehicular environments.

Figure 3:
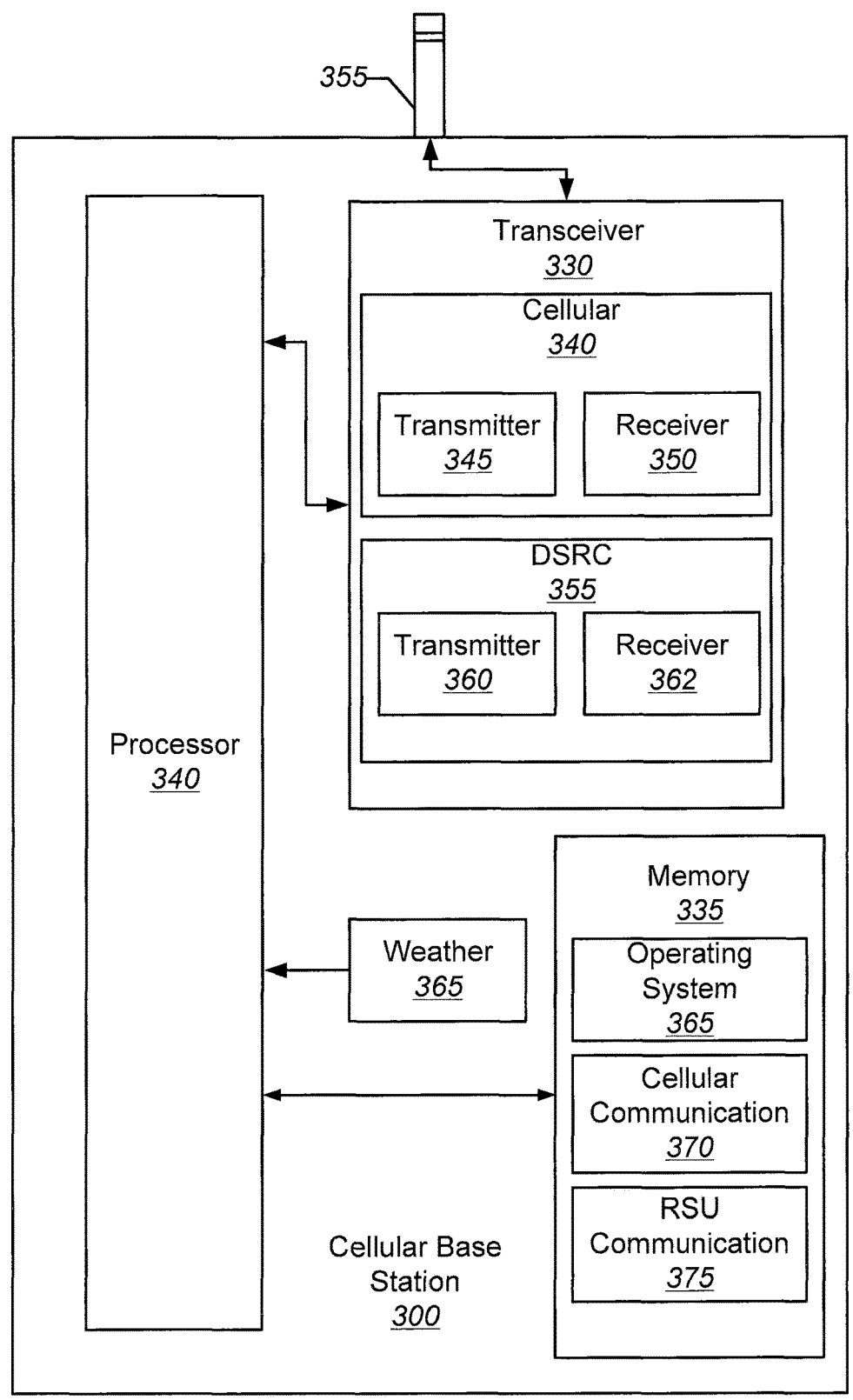
FIG. 3 is a block diagram that illustrates a combined cellular base station and roadside unit in accordance with some embodiments of the present inventive concept.

FIG. 3 is a block diagram that illustrates a combined cellular base station and roadside unit in accordance with some embodiments of the present inventive concept. Referring now to FIG. 3, an exemplary cellular base station 300 that may be used to implement the base station transceiver 220 of FIG. 2, in accordance with some embodiments of the present inventive concept, includes a transceiver 330, a memory 335, and a weather module 365 that communicate with a processor 340. The transceiver 330 comprises cellular transceiver module 340 and a dedicated short range communications (DSRC) module 355. The cellular transceiver module 340 comprises a transmitter circuit 345 and a receiver circuit 350, which respectively transmit outgoing radio frequency signals to mobile terminals and receive incoming radio frequency signals from the mobile terminals via an antenna 355. The radio frequency signals transmitted between mobile terminals and the cellular transceiver module 340 may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The DSRC module 355 comprises a transmitter circuit 360 and a receiver circuit 362, which respectively transmit and receive medium-range signals via the antenna 355 for use by intelligent transportation systems. In the United States, 75 MHz of spectrum in the 5.9 GHz band has been allocated for use in intelligent transportation systems. In Europe, 30 MHz of spectrum in the 5.9 GHz band has been allocated for intelligent transportation systems. A weather module 365 may be configured to collect data corresponding to measurement of one or more environmental parameters, such as, but not limited to, temperature, humidity, wind speed, and barometric pressure. The weather data collected by the weather module 365 may be communicated over the cellular network and/or over the RSU communication network to vehicles 205 and/or the traffic management center 290 of FIG. 2.

The processor 340 communicates with the memory 335 via an address/data bus. The processor 340 may be, for example, a commercially available or custom microprocessor. The memory 335 is representative of the one or more memory devices containing the software and data used to facilitate cellular and RSU communication in accordance with some embodiments of the inventive concept. The memory 335 may include, but is not limited to, the following types of devices: cache, ROM, PROM, EPROM, EEPROM, flash, SRAM, and DRAM.

As shown in FIG. 3, the memory 335 may contain up to three or more categories of software and/or data: the operating system 365, a cellular communication module 370, and an RSU communication module 375. The operating system 365 generally controls the operation of the cellular base station 300. In particular, the operating system 365 may manage the cellular base station's 300 software and/or hardware resources and may coordinate execution of programs by the processor 340. The cellular communication module 370 may be configured to originate, receive, and/or manage calls over a cellular communication network, such as the cellular communication network of FIG. 2. The RSU communication module 375 may be configured to originate, receive, and/or manage the communication of RSU data between vehicles 205 and the traffic management center 290. In some embodiments, the RSU communication module 375 may be configured to communicate data directly on the backhaul communication medium that connects the cellular base station 300 to the controller for the cellular base station, such as BSC 230 of FIG. 2. In accordance with various embodiments of the inventive concept, the backhaul communication medium may comprise a time division multiplexing connection, such as a T1 connection, and/or a packet switched connection, such as an Ethernet connection. Thus, the RSU communication module 375 may be configured to communicate packet data on the backhaul communication medium using a packet switching protocol, such as TCP/IP.

Figure 4:
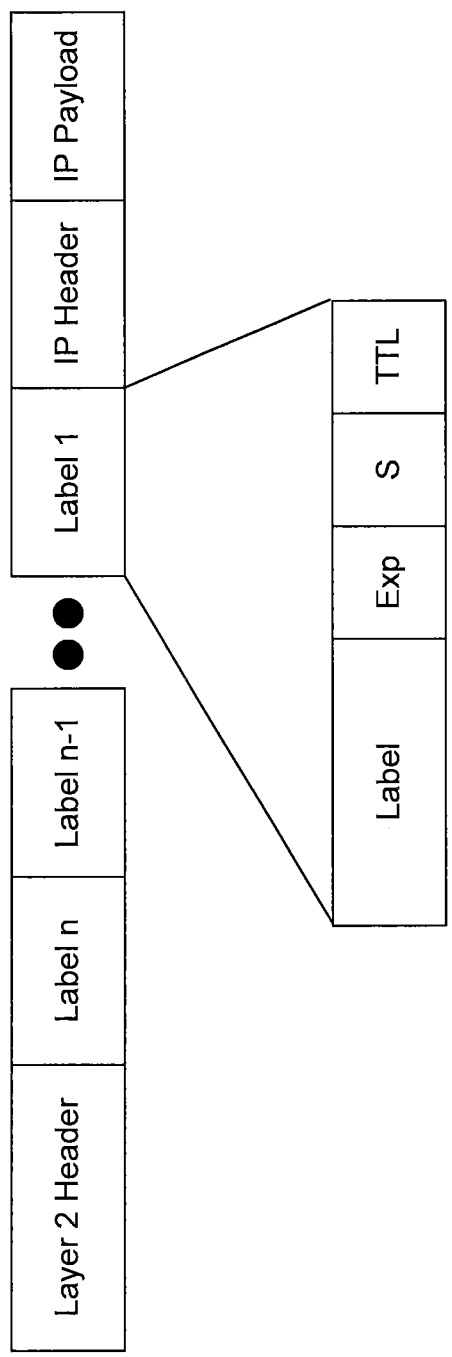
FIG. 4 is a block diagram that illustrates a multiprotocol label switching (MPLS) label and internet protocol (IP) packet in accordance with some embodiments of the inventive concept.

In some embodiments MLPS technology may be used to identify packets of the RSU communication module 375 and/or the weather module 365. Multiprotocol label switching (MPLS) provides a technique for routing packet data based on a label field rather than a destination address. An MPLS network comprises a set of nodes, which are called label switched routers (LSRs), that switch/route packets based on a label that has been added to each packet. Labels are used to define a flow of packets between two nodes or, if packets are being broadcast in a multicast operation, between a source node and multiple destination nodes. A specific path through the LSRs called a label switched path (LSP) is defined for each distinct flow, which is called a forwarding equivalence class (FEC). At intervening nodes in an LSP, an LSR may route the packet based on the MPLS label value, remove the MPLS label (pop a label), and/or impose an additional label (push a label). The label may be removed at the node from the packet at a node that is just prior to the destination node in a particular LSP. This process is sometimes referred to as "penultimate hop popping." Referring now to FIG. 4, an exemplary MPLS label and Internet Protocol (IP) packet are illustrated. The MPLS label is a 32-bit header that includes a 20-bit label field, a 3-bit Exp field that is reserved for experimental use, a 1-bit S field that is set to one for the oldest entry in the stack and zero for all other entries, and an 8-bit time-to-live (TTL) field that may be used to encode a hop count or time-to-live value. An MPLS label may also be referred to as an MPLS shim header. As shown in FIG. 1, multiple MPLS labels or shim headers may be included in a single IP packet. The MPLS labels or shim headers are organized as a last-in, first-out stack and are processed based on the top MPLS label or shim header. As discussed above, an LSR may add an MPLS label or shim header to the stack (push operation) or remove an MPLS label or shim header from the stack (pop operation).

In IP networks, packets are routed according to the address using a routing algorithm that typically selects the least number of "hops" to the destination. Other packet or cell networks, for example, may use similar routing algorithms for establishing connections rather than for routing each and every packet individually. Although such routing algorithms may be efficient in routing packet traffic to a destination, business considerations or governmental regulations may require that other, less efficient, traffic routing be used.

According to some embodiments of the inventive concept, an MPLS label may be used to carry an identifier that may be used to identify a communication service provider for the RSU communication module 375 packets and/or the weather module 365 packets. This may provide for a more efficient routing of the RSU data and/or weather data. The RSU and/or weather service may also be provided, managed, and/or regulated by a public governmental authority. Thus, the RSU communication module 375 packets and/or the weather module 365 packets may incorporate an identifier using an MPLS label to indicate that the RSU packets and/or weather module packets are associated with a regulatory constraint of a governmental administrative authority, e.g., that the RSU packet traffic and/or weather packet traffic is managed by a governmental agency. Because the RSU packet traffic may be associated with a government agency, it may not be subject to certain taxes, fees, and the like. The use of MPLS may allow the RSU and/or weather station traffic to be identified and processed separately including the ability to apply separate billing rates and exemptions to the traffic.

Although FIG. 3 illustrates an exemplary software and hardware architecture that may be used to provide a combined cellular base station and RSU, it will be understood that embodiments of the present inventive concept are not limited to such a configuration, but are intended to encompass any configuration capable of carrying out the operations described herein.

Computer program code for carrying out operations of devices and/or systems discussed above with respect to FIGS. 2-4 may be written in a high-level programming language, such as Java, C, and/or C++, for development convenience. In addition, computer program code for carrying out operations of embodiments of the present inventive concept may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Moreover, the functionality of the base station transceiver 220 and the cellular base station 300 of FIGS. 2 and 3 may each be implemented as a single processor system, a multi-processor system, or even a network of stand-alone computer systems, in accordance with various embodiments of the inventive concept.

Figure 5:
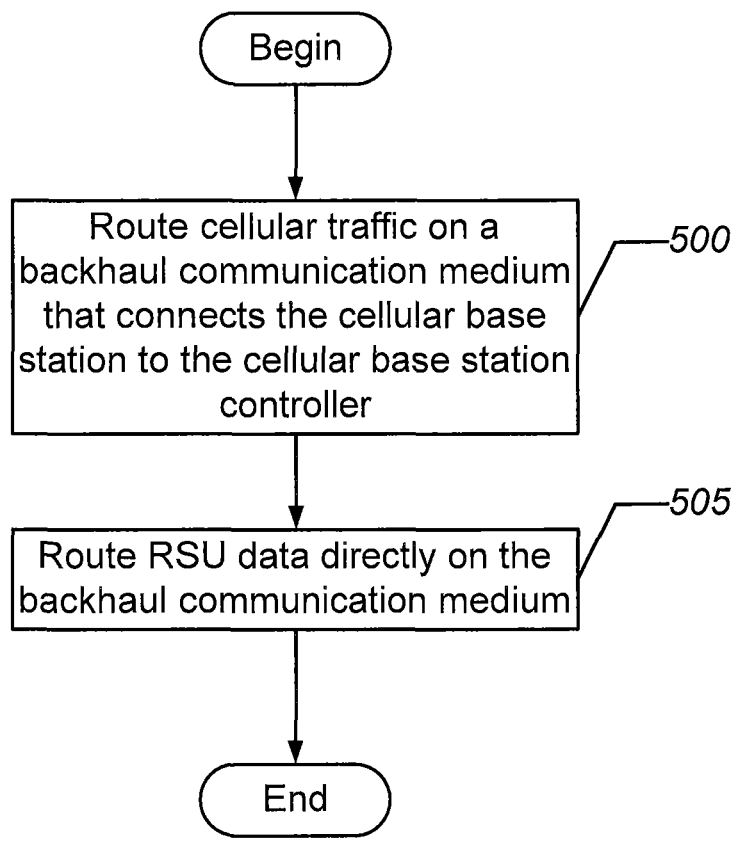
FIG. 5 is a flowchart that illustrates operations of a combined cellular base station and roadside unit in accordance with some embodiments of the present inventive concept.

FIG. 5 is a flowchart that illustrates operations of a combined cellular base station and RSU in accordance with some embodiments of the present inventive concept. Referring now to FIG. 5, operations begin at block 500 where the cellular communication module 370 routes cellular traffic on a backhaul communication medium that connects the cellular base station 220/300 to the cellular base station controller (BSC 230). The RSU communication module 375 routes RSU data directly onto the backhaul communication medium connecting the cellular base station 220/300 to the cellular base station controller (BSC 230) at block 505.

Embodiments of the inventive concept may provide a combined cellular base station and RSU that may facilitate the communication of RSU data over a backhaul communication connection typically owned and managed by a wireless communication services provider. In addition, the cellular base station and RSU may share other mechanical and/or electrical components, which may provide an economic benefit. For example, the cellular base station and RSU can share a common housing where each of the RSU and cellular base station are at least partially enclosed within the housing. The RSU and cellular base station may also share a common power supply, which is at least partially enclosed within the housing. In addition, a common mounting apparatus may be used to attach both the cellular base station and RSU to a support structure, such as a pole, platform, building, or other suitable structure.

One motivation for vehicular communication systems is safety and eliminating the excessive cost of traffic collisions. According to World Health Organizations (WHO), road accidents annually cause approximately 1.2 million deaths worldwide—one fourth of all deaths caused by injury. It is also estimated that about 50 million persons are injured worldwide in traffic accidents. Car crashes in the United States are currently estimated to cost the economy about $300 billion per year. Embodiments of the present inventive concept may facilitate a more rapid deployment of RSUs to better manage traffic on roadways and reduce accidents by taking advantage of existing backhaul plant connecting cellular base stations to base station controllers. By using the existing cellular backhaul communication medium to carry RSU data, governments need not purchase and construct their own electrical, optical, and/or wireless networks for connecting traffic management centers to RSUs.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a first computer, partly on the first computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A system, comprising:
a cellular base station; and
a roadside unit;
wherein the roadside unit (RSU) is configured to communicate RSU data directly on a backhaul communication medium that connects the cellular base station to a controller for the cellular base station;
wherein the backhaul communication medium comprises a packet switched connection to the controller;
wherein the RSU data comprise RSU Multiprotocol Label Switching (MPLS) packet data comprising a first label that identifies a communication service provider; and
wherein the RSU MPLS packet data comprise a second label that is associated with a regulatory constraint of a governmental administrative authority.

2. The system of claim 1, further comprising:
a housing;
wherein the cellular base station is at least partially enclosed within the housing; and
wherein the RSU is at least partially enclosed within the housing.

3. The system of claim 2, further comprising:
a power supply that is coupled to both the cellular base station and the RSU;
wherein the power supply is at least partially enclosed within the housing.

4. The system of claim 1, further comprising:
a processor that is coupled to the cellular base station and the RSU and is configured to process cellular base station data and the RSU data.

5. The system of claim 1, wherein the backhaul communication medium comprises a time division multiplexing connection to the controller.

6. The system of claim 2, farther comprising:
a weather module that is configured to communicate weather data on the backhaul communication medium;

wherein the weather module is at least partially enclosed within the housing.

7. The system of claim 6, wherein the weather data comprises a measurement of an environmental parameter.

8. The system of claim 7, wherein the measurement of the environmental parameter comprises one of a temperature measurement, a humidity measurement, a wind speed measurement, or a barometric pressure measurement.

9. The system of claim 6,
wherein the weather data comprise weather MPLS packet data comprising a third label that identies a communication service provider for the weather data.

10. The system of claim 9, wherein the packet data of the weather module comprise Multiprotocol Label Switching (MPLS) packet data,
wherein the RSU MPLS packet data comprise a fourth label that distinguishes the RSU data from the weather data; and
wherein the weather MPLS packet data comprise a fifth label that distinguishes the weather data from the RSU data.

11. The system of claim 1, further comprising:
a mounting apparatus that is configured to attach the cellular base station and the RS to a support structure.

12. The system of claim 1, wherein the cellular base station is configured to support LTE-V2V and or 5G-V2X and the RSU supports IEEE 802,11p.

13. A method, comprising:
routing cellular traffic on a backhaul communication medium that connects a cellular base station to a controller for the cellular base station;
routing roadside unit (RSU) data directly on the backhaul communication medium; and
communicating weather data directly on the backhaul communication medium;
wherein the backhaul communication medium comprises a packet switched connection to the controller;
wherein the RSU data comprise RSU Multiprotocol Label Switching (MPLS) packet data comprising a first label that identifies a communication service provider; and
wherein the weather data comprise weather MPLS packet data comprising a second label that identifies a communication service provider for the weather data.

14. The method of claim 13, wherein the RSU MPLS packet data comprise a third label that distinguishes the RSU data from the weather data; and
wherein the weather MPLS packet data comprise a fourth label that distinguishes the weather data from the RSU data.

15. The method of claim 13, wherein the weather data comprises a measurement of an environmental parameter.

16. The method of claim 15, wherein the measurement of the environmental parameter comprises one of a temperature measurement, a humidity measurement, a wind speed measurement, or a barometric pressure measurement.

17. The method of claim 13,
wherein the RSU MPLS packet data comprise a third label that is associated with a regulatory constraint of a governmental administrative authority.

18. A method, comprising:
routing cellular traffic on a backhaul communication medium that connects a cellular base station to a controller for the cellular base station; and
routing roadside unit (RSU) data directly on the backhaul communication medium;
wherein the backhaul communication medium comprises a packet switched connection to the controller;
wherein, the RSU data comprise RSU Multiprotocol Label Switching (MPLS) packet data comprising a first label that identifies a communication service provider; and
wherein the RSU MPLS packet data comprise a second label that is associated with a regulatory constraint of a governmental administrative authority.

19. The method of claim 18, wherein the backhaul communication medium comprises an Ethernet connection.

20. The method of claim 18, further comprising:
communicating weather data on the backhaul communication medium;
wherein the weather data comprises one of a temperature measurement, a humidity measurement, a wind speed measurement, or a barometric pressure measurement.

* * * * *

UNITED STATES PATENT AND TRADEMARK OFFICE
CERTIFICATE OF CORRECTION

PATENT NO. : 10,499,457 B2  
APPLICATION NO. : 15/718426  
DATED : December 3, 2019  
INVENTOR(S) : Michaelis et al.

Page 1 of 1

It is certified that error appears in the above-identified patent and that said Letters Patent is hereby corrected as shown below:

In the Claims

Column 12, Line 65, Claim 6: Please correct "farther" to read -- further --

Column 13, Line 27, Claim 12: Please correct "802,11p." to read -- 802.11p. --

Signed and Sealed this
Twenty-fifth Day of February, 2020

Andrei Iancu
*Director of the United States Patent and Trademark Office*